(12) United States Patent
Xu et al.

(10) Patent No.: US 11,753,696 B2
(45) Date of Patent: Sep. 12, 2023

(54) METHOD FOR CONTROLLING DEFORMATION OF A LARGE-SCALE CRANKSHAFT

(71) Applicant: BEIJING INSTITUTE OF TECHNOLOGY, Beijing (CN)

(72) Inventors: Chunguang Xu, Beijing (CN); Yuren Lu, Beijing (CN); Peng Yin, Beijing (CN); Peilu Li, Beijing (CN); Dezhi Li, Beijing (CN); Shuangyi Li, Beijing (CN); Wenyuan Song, Beijing (CN); Zhaowei Miao, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 133 days.

(21) Appl. No.: 17/363,579

(22) Filed: Jun. 30, 2021

(65) Prior Publication Data
US 2022/0081736 A1    Mar. 17, 2022

(30) Foreign Application Priority Data
Sep. 16, 2020   (CN) .......................... 202010974909.2

(51) Int. Cl.
  *C21D 11/00*   (2006.01)
  *C21D 9/30*    (2006.01)
  *C21D 10/00*   (2006.01)

(52) U.S. Cl.
  CPC ............... *C21D 11/00* (2013.01); *C21D 9/30* (2013.01); *C21D 10/00* (2013.01);
  (Continued)

(58) Field of Classification Search
  CPC .......... C21D 11/00; C21D 9/30; C21D 10/00
  See application file for complete search history.

(56) References Cited

U.S. PATENT DOCUMENTS 11,542,570 B2 *   1/2023   Xu ..................... B06B 1/0622

FOREIGN PATENT DOCUMENTS

| CN | 03219437.4 U | 12/2003 |
|---|---|---|
| CN | 102010972 A | 4/2011 |

(Continued)

OTHER PUBLICATIONS

Of Chunguang Xu [CN109680141A] (machine translation) (Year: 2019).*

*Primary Examiner* — Brian D Walck
*Assistant Examiner* — Nazmun Nahar Shams
(74) *Attorney, Agent, or Firm* — John A. Miller; Shumaker, Loop & Kendrick, LLP

(57) ABSTRACT

A method for controlling deformation of a large-scale crankshaft comprising detecting and recording stress value(s) of part(s) to be regulated by the crankshaft; fixing the crankshaft on a tool to couple transmitting ends of high-energy acoustic beam transducers with the part(s) to be regulated; turning on the high-energy acoustic beam transducers to emit high-energy acoustic beams into the crankshaft, controlling working frequencies of the high-energy acoustic beam transducers within a range of 10-30 kHz, and setting a predicted regulation and control time according to the stress value(s) of the part(s) to be regulated; and closing the high-energy acoustic beam transducers when the predicted regulation and control time is reached, and taking the crankshaft out of the tool.

8 Claims, 3 Drawing Sheets

(52) U.S. Cl.
CPC ...... *F16C 2210/00* (2013.01); *F16C 2223/10* (2013.01); *F16C 2223/30* (2013.01); *F16C 2360/00* (2013.01)

(56) References Cited

FOREIGN PATENT DOCUMENTS

| CN | 201410099482.0 | A  | 6/2014  |
|----|----------------|----|---------|
| CN | 107460299      | A  | 12/2017 |
| CN | 110117712      | A  | 8/2019  |
| CN | 110157894      | A  | 8/2019  |
| SU | 1373732        | A1 | 2/1988  |

\* cited by examiner

METHOD FOR CONTROLLING DEFORMATION OF A LARGE-SCALE CRANKSHAFT

CROSS-REFERENCE TO RELATED APPLICATIONS

This application claims priority to China Patent Application Serial No. 202010974909.2 filed Sep. 16, 2020, the entire disclosure of which is herein incorporated by reference.

BACKGROUND

Field

The invention relates to the field of machining control of a large-scale crankshaft, and in particular to a method for controlling deformation of a large-scale crankshaft.

Discussion of the Related Art

The crankshaft is the most important component of an engine. It receives the force from the connecting rod and converts it into torque, which is output by the crankshaft and drives other accessories of the engine. The crankshaft is subjected to the combined action of centrifugal force of the rotating mass, gas inertia force of periodic variation and reciprocating inertia force, so that the crankshaft is subjected to the action of bending and torsion loads. Therefore, the crankshaft is required to have enough strength and rigidity with a wear-resistant axle journal surface, work uniformly and have good balance. Compared with other components, the production of the large-scale crankshaft blank mainly adopts hot die forging, and the rough machining of the crankshaft widely adopts advanced equipment such as a numerical control lathe, milling machine and the like to carry out numerical control turning, internal milling and turning-broaching machining on the main journal and the connecting rod journal so as to effectively reduce the deformation of the machining of the crankshaft. The finish machining of the crankshaft adopts widely a CNC-controlled crankshaft grinder to perform finish grinding on the journal of the crankshaft. In addition, in order to ensure the machining hardness of the crankshaft, the crankshaft is required to perform surface hardening treatment by adopting intermediate frequency quenching and nitriding treatment. Thus, the machining process is complex, and the deformation is overlarge due to complex residual stress generated in the machining process.

For the machining process of a large-scale crankshaft, a machining tool still depends on foreign import, machining process parameters and the like still depend on foreign empirical values, so that machining yield of the crankshaft is low. Residual stress concentration caused by a complex machining process is the most main reason of the out-of-tolerance of machining deformation of the crankshaft. Particularly, when a machining tool is removed, the crankshaft immediately generates visible deformation after being taken down due to the action of the residual stress, and meanwhile, many failures of the crankshaft, such as stress corrosion, fatigue and the like, are closely related to the residual stress. In order to avoid the above problems such as deformation and the like, a method for controlling crankshaft machining deformation is urgently needed, which can control crankshaft deformation.

The literature search shows that the existing method for removing crankshaft machining residual stress still depends on the traditional annealing stress removing method, and no related other method for removing the residual stress is worth using for reference. In the prior art, there are many methods and devices for reducing residual stress of metal materials, such as annealing, tempering, vibration impact, etc. For example, an invention patent application (application No. 201410099482.0) entitled "Residual stress eliminating device based on high-energy acoustic and magnetic coupling principle" discloses a device for eliminating residual stress of a metal material induced during machining processes such as cutting, heat treatment, welding and the like. For another example, utility model patent (application No. 03219437.4) entitled "Portable vibrating treatment apparatus for removing residual stress of welding" discloses a device capable of remarkably eliminating the welding residual stress, improving the bearing capacity and the fatigue life of a welding structure. Both of the above-mentioned prior arts relate to devices for eliminating residual stress of a metal material, and the methods and devices used are complicated, but no description is given of the control of the machining deformation.

Therefore, a method for controlling deformation of a large-scale crankshaft is needed to eliminate or reduce the machining residual stress of the crankshaft more conveniently.

SUMMARY

In view of this, a main object of the present disclosure is to provide a method for controlling deformation of a large-scale crankshaft, so as to reduce the machining residual stress of the crankshaft more conveniently.

The method for controlling deformation of a large-scale crankshaft provided by the disclosure comprises:
- a step S1 of detecting and recording stress value(s) of part(s) to be regulated of the crankshaft;
- a step S2 of fixing the crankshaft on a tool to couple transmitting ends of high-energy acoustic beam transducers with the part(s) to be regulated;
- a step S3 of turning on the high-energy acoustic beam transducers to emit high-energy acoustic beams into the crankshaft, controlling working frequencies of the high-energy acoustic beam transducers within a range of 10-30 kHz, and setting a predicted regulation and control time according to the stress value(s) of the part(s) to be regulated; and
- a step S4 of closing the high-energy acoustic beam transducers when the predicted regulation and control time is reached, and taking the crankshaft out of the tool.

By adopting the method, the part(s) to be regulated and controlled by the crankshaft can be completely coupled with the high-energy acoustic beam transducers, the high-energy acoustic beam transducers are turned on to inject high-energy ultrasonic waves into the crankshaft, mass points inside the crankshaft are driven to vibrate along the acoustic beam direction under the condition that the working frequencies of the ultrasonic waves is within the range of 10-30 kHz, and the machining residual stress of the crankshaft is removed through the high-energy acoustic beams to realize the regulation and control of the residual stress in the material in the specific direction. The machining precision of the crankshaft is guaranteed, and the machining deformation of the crankshaft is reduced.

Preferably, after the step S4, the method further includes: a step S5 of detecting and recording the stress value(s) of the part(s) to be regulated of the crankshaft, comparing the stress value(s) with the stress value(s) detected last time, returning to the step S2 if the stress value(s) is reduced, and ending if the stress value(s) is not changed.

By adopting the method, it is determined if the regulation and control of the residual stress in the crankshaft is finished by comparing the residual stress value(s) before and after the regulation and control, so that machining precision of the crankshaft is ensured, and machining deformation of the crankshaft is reduced.

Preferably, the step S3 further comprises adjusting operating frequencies and voltages of the high energy acoustic beam transducers to make phases of the voltage and the output current consistent.

By adopting the method, the working frequencies and the working voltages of the high-energy acoustic beams are adjusted according to the frequencies of the high-energy acoustic beam transducers to ensure that the phases of the output voltage and the output current are consistent. Therefore, a better regulation effect can be achieved, and the regulation effect of the high-energy acoustic beams on the residual stress of the crankshaft can be better.

Preferably, the step S3 further comprises controlling the high energy acoustic beams to focus sound wave energy on a surface or an inside of the material.

By adopting the method, the directivity of the acoustic beams can focus the sound wave energy on any position of the surface and inside of the material to realize the local focusing, directional reduction and homogenization of the residual stress in the material.

Preferably, the step S2 further comprises aligning the crankshaft with the crankshaft axis by fixing the tool.

By adopting the method, the crankshaft can be straightened to a certain extent, machining precision of the crankshaft is ensured, and machining deformation of the crankshaft is reduced.

Preferably, the high-energy acoustic beams may include at least one of high-energy acoustic waves of low frequency and high energy, high energy acoustic waves of high frequency and low energy, high energy acoustic waves of wide frequency band and wide-range energy, and high energy sound waves in the form of longitudinal wave, transverse wave, surface wave and guided wave modes.

By adopting the method, the residual stress can be reduced and homogenized by selecting proper high-energy acoustic beams according to different positions of the residual stress.

Preferably, the step S2 further comprises coating a coupling medium on the transmitting ends of the high-energy acoustic beam transducers.

Preferably, the coupling medium can be industrial grease, ultrasonic transverse and longitudinal wave coupling agent, honey or glycerol.

By adopting the method, the energy loss of the high-energy acoustic beams can be reduced, and the effect of eliminating and homogenizing the residual stress is improved.

DESCRIPTION OF THE REFERENCE NUMERALS

Figure 1:
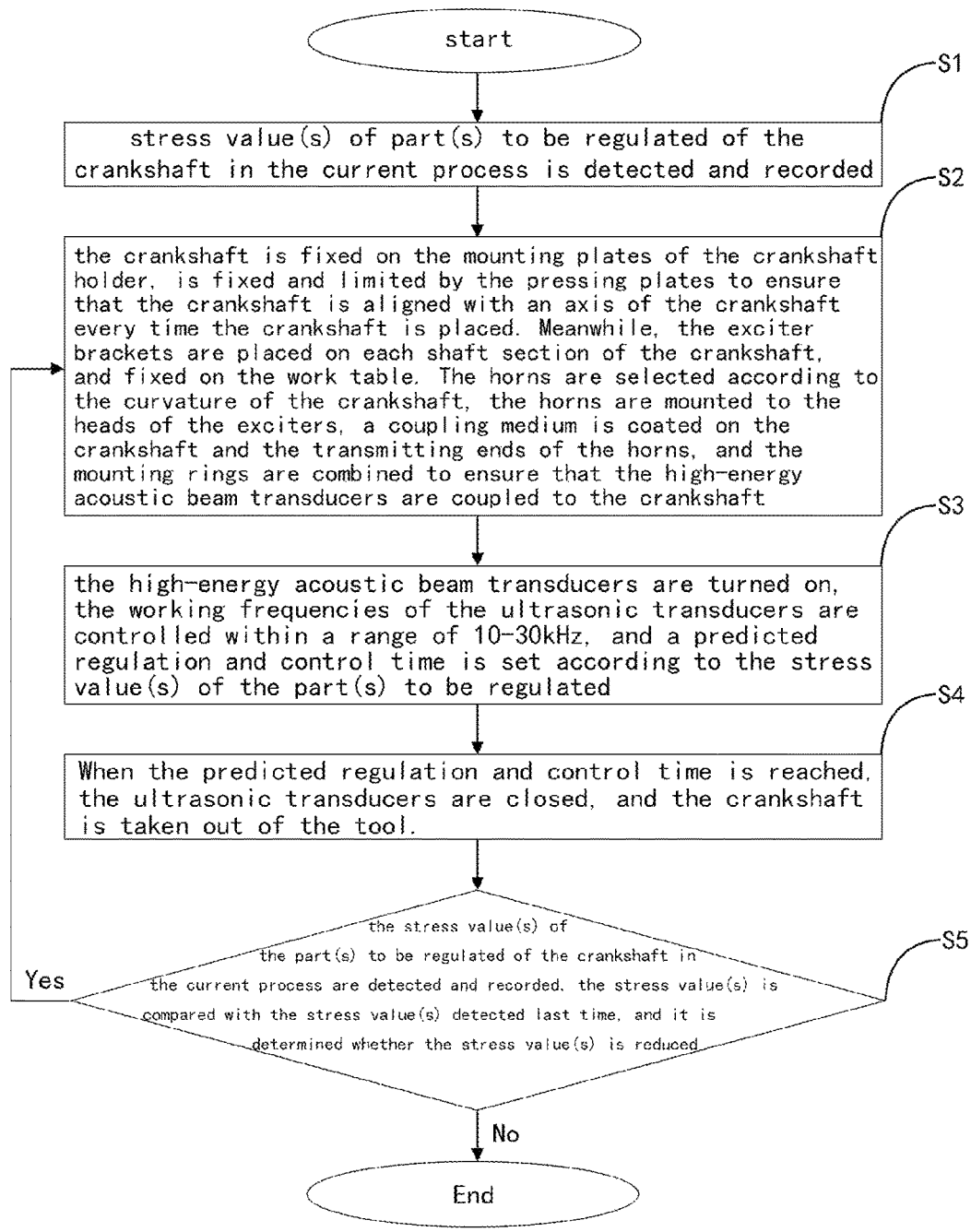
FIG. 1 is a flow chart of a method of controlling deformation of a large-scale crankshaft according to an embodiment of the present application.

A work table 1; a crankshaft holder 2; an adjusting plate 21; a mounting plate 22; a first mounting opening 221; a pressing plate 23; a second mounting opening 231; an exciter bracket 3; a mounting ring 31; a high energy acoustic beam transducer 4; an exciter 41; a horn 42.

DETAILED DESCRIPTION OF THE EMBODIMENTS

The specific contents of the method for controlling deformation of a large-scale crankshaft according to an embodiment of the present disclosure will be described in detail below with reference to the accompanying drawings.

Figure 2:
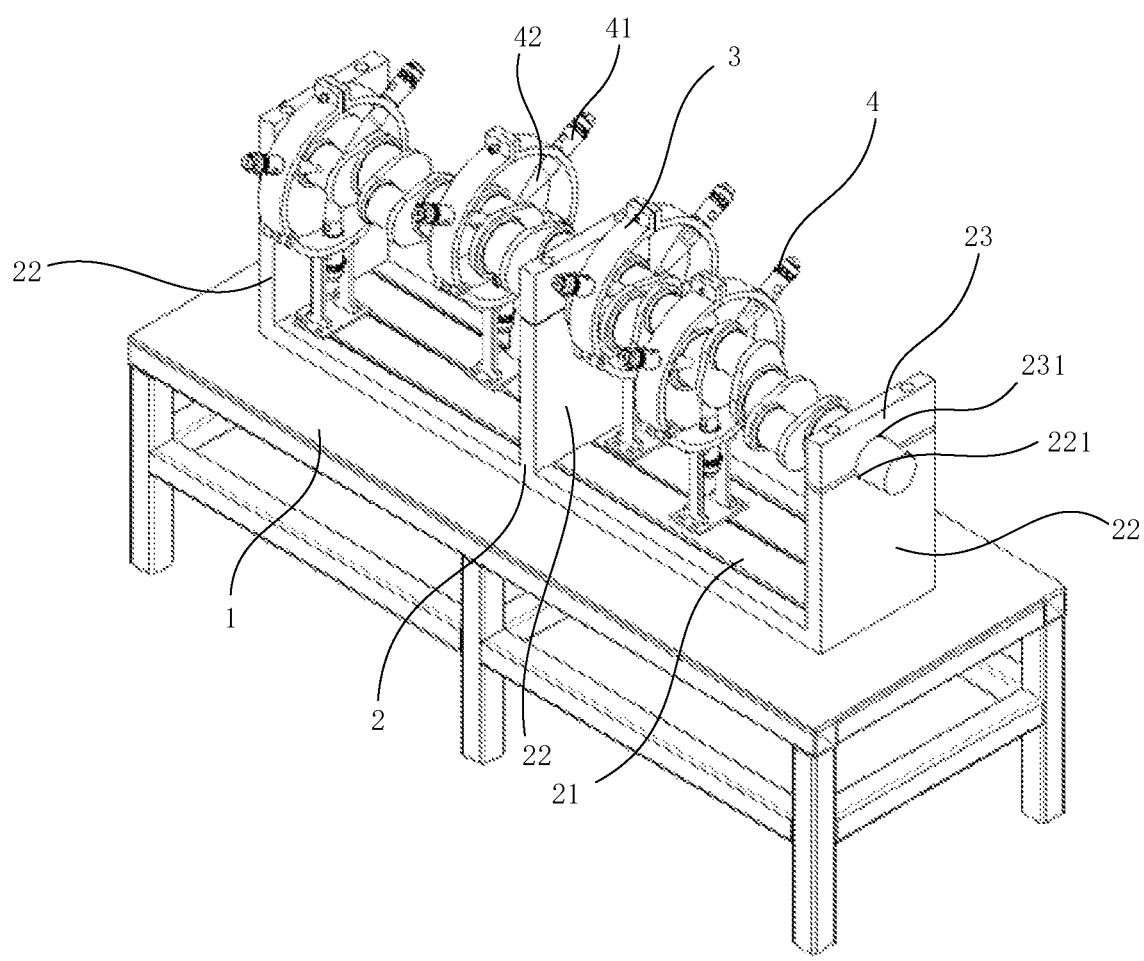
FIG. 2 is a tool for the method for controlling deformation of a large-scale crankshaft.

FIG. 1 is a flow chart of a method for controlling deformation of a large-scale crankshaft according to the present application; FIG. 2 shows a tool for the method for controlling deformation of a large-scale crankshaft. As shown in FIG. 1 and FIG. 2, the present application provides a method for controlling deformation of a large-scale crankshaft, and also provides a tool applicable to the method.

As shown in FIG. 2, the tool includes: a work table 1; and a crankshaft holder 2 fixedly disposed on the work table 1, which includes a rectangular adjusting plate 21 horizontally arranged on the work table 1 and mounting plates 22 vertically arranged in parallel at two ends and in the middle of the upper part of the adjusting plate 21. The mounting plates 22 each have a first mounting opening 221 that is V-shaped and opened upward and configured for receiving a crankshaft. The upper end of each mounting plate 22 is provided with a pressing plate 23. The lower part of each pressing plate 23 is provided at a position opposite the first mounting opening with a second mounting opening 231 that is V-shaped and opened downward. The pressing plates 23 are fixed on the mounting plates 22 through screws, so that the crankshaft is fixed on the crankshaft holder 2, and simultaneously, the crankshaft can be aligned to an axis of the crankshaft through the limiting action of the first mounting openings 221 and the second mounting openings 231. Exciter brackets 3 are arranged on the adjusting plate 21, and each exciter bracket 3 is provided with a mounting ring 31. The mounting ring 31 is uniformly divided into three segments of circular ring-shaped part, wherein two ends of one segment at the lower part are respectively hinged with one ends of the other two segments, and the other ends of the other two segments are fixedly connected through a bolt. After the crankshaft is fixed on the mounting plates 22, the mounting ring 31 can be sleeved on the position to be regulated of the crankshaft. The middle parts of the three segments of the mounting ring 31 are respectively provided with high-energy acoustic beam transducers 4 facing the center of the mounting ring 31. The high-energy acoustic beam transducer 4 each include an exciter 41 and a horn 42 arranged at the transmitting end of the exciter 41. The end part of the horn 42 has a curved surface with the same radian as the crankshaft, so that the horn 42 can fit the crankshaft. The vibration amplitude of the ultrasonic waves emitted from the exciter 41 can be increased by the horn 42. The contact part between the horn 42 and the crankshaft may also be coated with a coupling medium to reduce the energy loss of the ultrasonic waves.

As shown in FIG. 1, the method for controlling deformation of a large-scale crankshaft specifically includes steps S1 to S5.

In the step S1, the stress value(s) of the part(s) to be regulated of the crankshaft member in the current process is detected and recorded.

The process with larger machining deformation of the crankshaft is determined, stress distribution after the process is detected in detailed to determine the part(s) to be regulated of the crankshaft, and machining stress of the crankshaft can be evaluated by adopting a nondestructive detection method of an ultrasonic critical refraction longitudinal wave. The stress of the crankshaft can be detected in a nondestructive and in-situ manner by ultrasonic detection. Further, the stress value may be detected again after the step S2 described below, which does not hinder the operation of regulating the crankshaft.

In the step S2, the crankshaft is fixed on the mounting plates 22 of the crankshaft holder 2, and is fixed and limited by the pressing plates 23, so as to ensure that the crankshaft is aligned with the crankshaft axis every time the crankshaft is placed. Meanwhile, the exciter brackets 3 are placed on shaft sections of the crankshaft and fixed on the work table 1. The horns 42 are selected according to the curvature of the crankshaft, the horns are mounted to the heads of the exciters 41, the coupling medium is coated on the crankshaft and the transmitting ends of the horns 42, and the mounting rings 31 are combined to ensure that the high-energy acoustic beam transducers 4 are coupled to the crankshaft.

In the step S3, the high-energy acoustic beam transducers 4 are turned on, the working frequencies of the ultrasonic transducers are controlled within the range of 10-30 kHz, and the predicted regulation and control time is set according to the stress value(s) of the part(s) to be regulated and controlled.

In the step S4, when the predicted regulation and control time is reached, the ultrasonic transducers are closed, and the crankshaft is taken out of the tool.

In the step S5, the stress value(s) of the part(s) to be regulated of the crankshaft in the current process are detected and recorded again, the stress values are compared with the stress values detected last time, the method returns to the step S2 again if the stress values are reduced, and the method ends if the stress value(s) is not changed any more.

The method for controlling deformation of the large-scale crankshaft according to the present invention adopts the high-energy acoustic beam to remove machining residual stress of the crankshaft, so that machining precision of the crankshaft is guaranteed, and machining deformation of the crankshaft is reduced. By coupling completely the part(s) to be regulated of the crankshaft and the high energy acoustic beam transducers 4 and turning on the high energy acoustic beam transducers 4, high energy ultrasonic waves are injected into the crankshaft. Under the circumstances that the operating frequencies of the ultrasonic waves are guaranteed in a range of 10-30 kHz, mass points inside the crankshaft are driven to vibrate along the direction of the acoustic beams, so as to realize the regulation and control of the residual stress in the material in the specific direction. The directivity of the acoustic beams can focus the acoustic energy on any position of the surface and inside of the material such that the local focusing, directional reduction and the homogenization of the residual stress in the material are realized.

Figure 3:
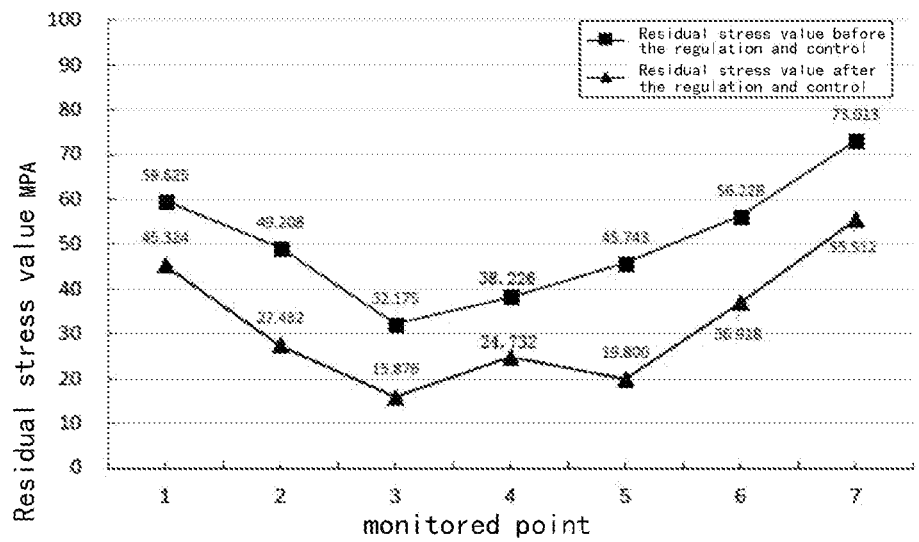
FIG. 3 is a graph showing the distribution of residual stress values before and after the control by the method of the present application.
Figure 4:
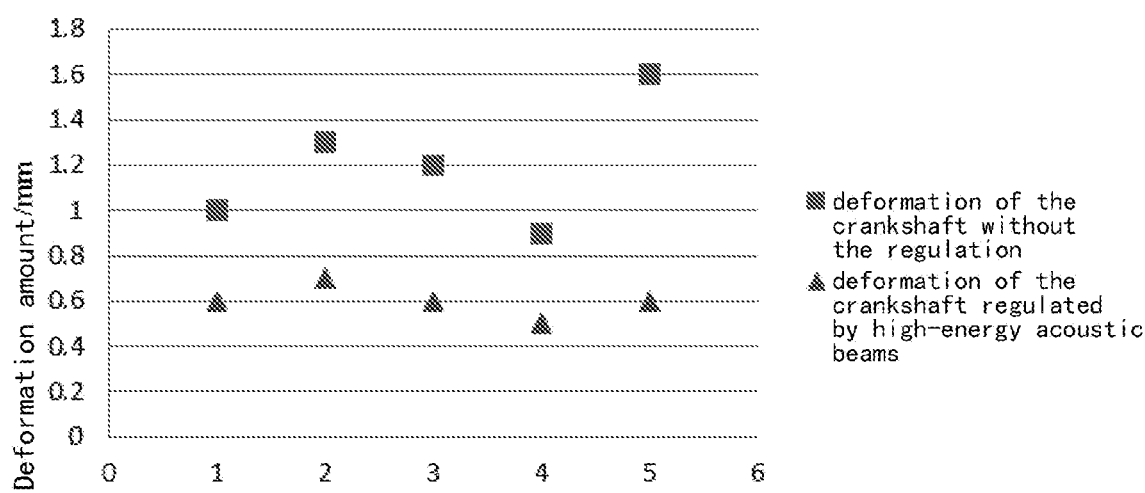
FIG. 4 is a graph comparing deformation of the crankshaft.

FIG. 3 is a graph showing the distribution of residual stress before and after the regulation and control by the method of the present application; FIG. 4 is a graph comparing deformation of the crankshaft. As shown in FIG. 3, a line with squares represents a distribution of the residual stress value of the crankshaft after the crankshaft is machined, and a line with triangles represents a distribution of residual stress value of the crankshaft regulated by the method for controlling deformation of the large-scale crankshaft provided by the present application. It can be seen by comparing the residual stresses before and after the regulation, the residual stress of each monitored point of the crankshaft after the regulation is obviously reduced compared with that before the regulation. As shown in FIG. 4, machining deformation of the crankshaft without the regulation is far greater than deformation of the crankshaft subjected to the regulation by the high-energy acoustic beam. It can be clearly and effectively demonstrated that the method provided by the embodiment of the present application has strong capability of reducing residual stress and controlling machining deformation of the crankshaft.

In order to make the high-energy acoustic beam have better regulation effect on the crankshaft and more effectively remove the residual stress inside the crankshaft, before the step S3 and/or during the step S3, a step S21 may be further included. In the step S21, the operating frequencies and voltages of the high-energy acoustic beam transducers 4 are adjusted according to the frequencies of the high-energy acoustic beam transducers 4 used in the above embodiment, so as to ensure that the output voltage and the output current have the same phase to achieve better regulation effect, and thus more effectively remove the residual stress of the crankshaft.

Further, in the step S3, the operating frequency and voltage of the high-energy acoustic beams may also be adjusted according to the waveform change displayed by the oscilloscope. The oscilloscope can be electrically connected with the high-energy acoustic beam transducers 4, the voltage value change or the current value change of the high-energy acoustic beams is displayed in real time after the power is amplified so as to reflect the energy magnitude of the high-energy acoustic beams entering the crankshaft. The larger the displayed numerical value of the voltage value or the current value is, the larger the energy of the high-energy acoustic beam is, and the smaller the numerical value of the voltage value or the current value is, the smaller the energy of the high-energy acoustic beams is. Therefore, the input voltage and the input frequency can be adjusted at any time to adjust the energy of the emitted high-energy acoustic beams, so that the high-energy acoustic beams can continuously input proper energy, a better regulation state is always kept, and a better regulation effect can be achieved.

Further, the high energy sound waves emitted by the high energy acoustic beam transducers 4 may be: high-energy sound waves of low frequency and high energy, high-energy sound waves of high frequency and low energy, high-energy sound waves of wide frequency band and wide-range energy, and high-energy sound waves in the form of longitudinal wave, transverse wave, surface wave and guided wave modes. Therefore, different high-energy sound waves can be produced according to the crankshaft, and the residual stress in the crankshaft with different curvatures and thicknesses can be reduced and homogenized.

The above description is only for the purpose of illustrating the preferred embodiments of the present application and should not be taken as limiting the scope of the present application. Any modifications, equivalents, improvements, etc. made within the spirit and scope of the present invention should be included in the scope of protection of the present application.

What is claimed is:

1. A method for controlling deformation of a crankshaft, comprising:
   a step S1 of detecting and recording stress value(s) of part(s) to be regulated by the crankshaft;
   a step S2 of placing the crankshaft on mounting plates of a crankshaft holder and causing the crankshaft to be limited by pressing plates of the crankshaft holder so as to ensure that the crankshaft is aligned with an axis of the crankshaft every time the crankshaft is placed; placing exciter brackets on shaft sections of the crankshaft; selecting horns corresponding to a curvature of the crankshaft, mounting the horns to heads of exciters, and coating a coupling medium on the crankshaft and transmitting ends of the horns; sleeving mounting rings of the exciter brackets on position(s) to be regulated of the crankshaft; and providing acoustic beam transducers each of which is placed on a middle one of three segments of one of the mounting rings and faces a center of the respective mounting ring;
   a step S3 of turning on the acoustic beam transducers to emit acoustic beams into the crankshaft, and controlling working frequencies of the acoustic beam transducers within a range of 10-30 kHz; and
   a step S4 of closing the acoustic beam transducers when a control time is reached, and taking the crankshaft out of the tool, wherein the control time increases as the stress value(s) of the part(s) to be regulated increases.

2. The method of claim 1, wherein after the step S4, further comprising:
   a step S5 of detecting and recording stress value(s) of the part(s) to be regulated of the crankshaft, comparing the stress value(s) with the stress value(s) detected last time, returning to the step S2 if the stress value(s) is reduced, and ending if the stress value(s) is not changed.

3. The method of claim 1, wherein the step S3 further comprises changing operating frequencies and voltages of the acoustic beam transducers to make phases of the voltages and output currents consistent.

4. The method of claim 1, wherein the step S3 further comprises changing directions of the acoustic beams to focus acoustic wave energy on a surface or inside of the material.

5. The method of claim 1, wherein the step S2 further comprises aligning the crankshaft with an axis of the crankshaft by fixing the tool.

6. The method of claim 1, beams includes at least one of high-energy sound waves of low frequency and high energy, high-energy sound waves of high frequency and low energy, high-energy sound waves of wide frequency band and wide-range energy, and high-energy sound waves in the form of longitudinal wave, transverse wave, surface wave and guided wave modes.

7. The method of claim 1, wherein the step S2 further comprises coating a coupling medium on the transmitting ends of the acoustic beam transducers.

8. The method of claim 7, wherein the coupling medium is industrial grease, ultrasonic transverse and longitudinal wave coupling agent, honey, or glycerin.

* * * * *